US007792611B2

(12) United States Patent
Scheer

(10) Patent No.: US 7,792,611 B2
(45) Date of Patent: Sep. 7, 2010

(54) SPRAY PATTERN CHARACTERIZATION AND MONITORING METHOD AND SYSTEM

(76) Inventor: Ingo Werner Scheer, 6455 La Jolla Blvd., La Jolla, CA (US) 92037

( * ) Notice: Subject to any disclaimer, the term of this patent is extended or adjusted under 35 U.S.C. 154(b) by 1306 days.

(21) Appl. No.: 11/243,142

(22) Filed: Oct. 3, 2005

(65) Prior Publication Data

US 2006/0081039 A1 Apr. 20, 2006

Related U.S. Application Data

(60) Provisional application No. 60/615,169, filed on Oct. 1, 2004.

(51) Int. Cl.
*G05D 7/00* (2006.01)
*G05D 11/00* (2006.01)

(52) U.S. Cl. ........................ 700/283; 239/11; 239/117; 382/209; 73/64.53

(58) Field of Classification Search ................ 700/283; 382/100, 141, 209; 239/11, 117; 356/318, 356/335, 393; 73/64.53
See application file for complete search history.

(56) References Cited

U.S. PATENT DOCUMENTS

| | | | | |
|---|---|---|---|---|
| 3,770,351 | A * | 11/1973 | Wyatt | 356/336 |
| 4,712,736 | A * | 12/1987 | Bray et al. | 239/11 |
| 4,796,999 | A * | 1/1989 | Schuster et al. | 356/394 |
| 6,246,786 | B1 * | 6/2001 | Nishikiori et al. | 382/134 |
| 6,457,655 | B1 | 10/2002 | Reighard | |
| 6,734,965 | B2 * | 5/2004 | Talley et al. | 356/318 |
| 6,973,199 | B2 * | 12/2005 | Farina | 382/100 |
| 7,272,260 | B1 * | 9/2007 | Kakiuchi et al. | 382/217 |
| 2004/0264759 | A1 * | 12/2004 | Hattori et al. | 382/145 |
| 2006/0225489 | A1 * | 10/2006 | Giles et al. | 73/64.53 |
| 2007/0236693 | A1 | 10/2007 | Prociw | |
| 2007/0242871 | A1 | 10/2007 | Prociw | |

FOREIGN PATENT DOCUMENTS

| | | |
|---|---|---|
| WO | WO 01/13092 A1 | 2/2001 |
| WO | WO 01/13322 A1 | 2/2001 |

OTHER PUBLICATIONS

Chen S, "Factors influencing the circumferential liquid distribution from pressure-swirl atomizers", Journal of Engineerin for Gas Turbines an Power, 115:447-452, Jul. 1, 1993.

Tate, R. W., "Spray Patternation," Industrial and Engineering. Chemistry, vol. 52, Oct. 1960, p. 49A.

Wang, G et al., An Optical Spray Pattern Analyzer, extended abstracts from the 10.sup.th Annual Conference on Liquid Atomization and Spray Systems, ILASS-Americas 97, May 18-2.

* cited by examiner

*Primary Examiner*—Paul L Rodriguez
*Assistant Examiner*—Sheela Rao

(57) ABSTRACT

The purpose of the invention is to provide a method to characterize a spray pattern by detecting and quantifying asymmetries resulting in detailed information on location, size, and type of asymmetries within the spray pattern, which are important for spray characterization comparability and classification. A system is provided for in-situ monitoring of the spray characteristics.

25 Claims, 13 Drawing Sheets

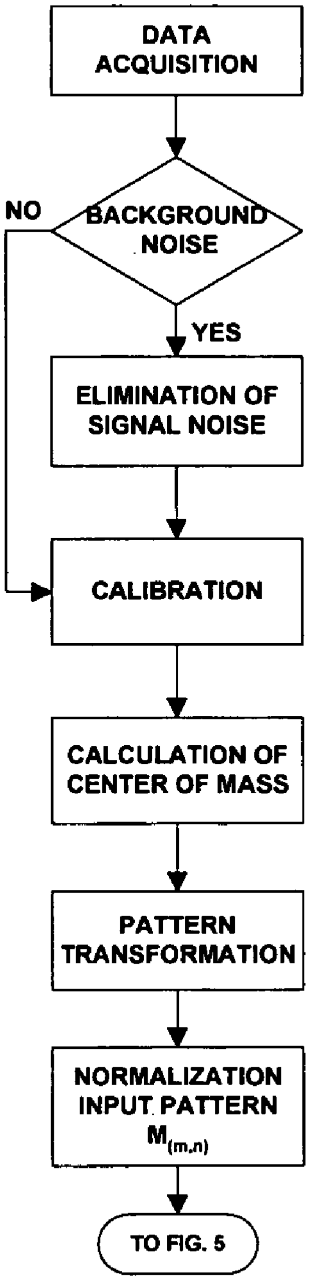
FIG 2
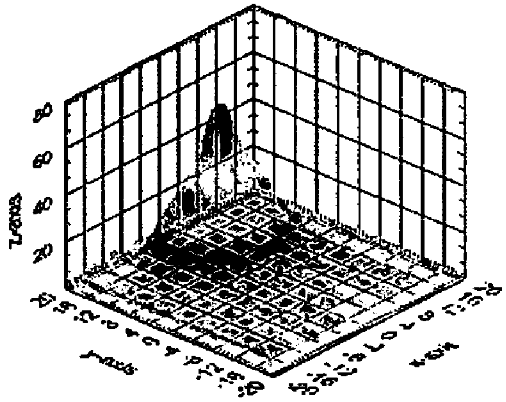
FIG 3.1
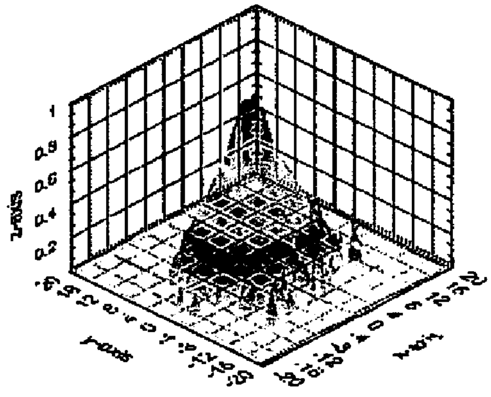
FIG 3.2

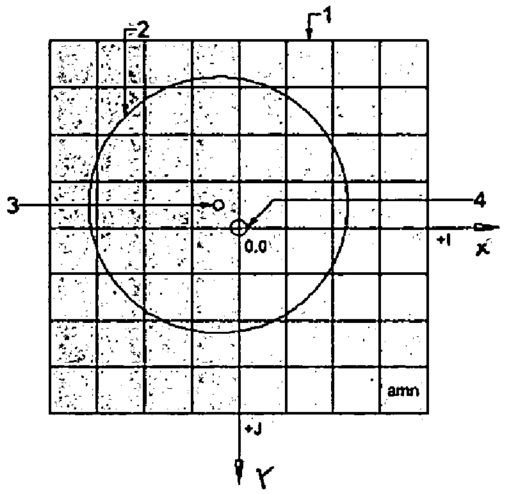
FIG 4.1
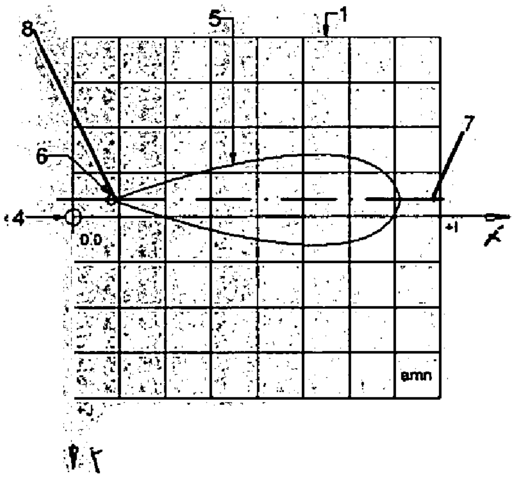
FIG 4.2

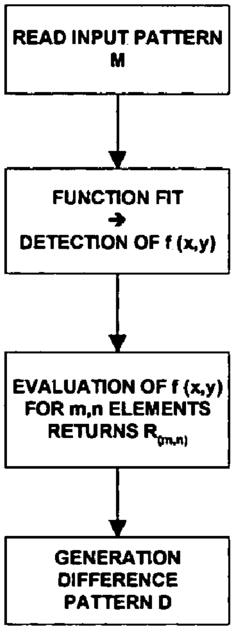
FIG 10
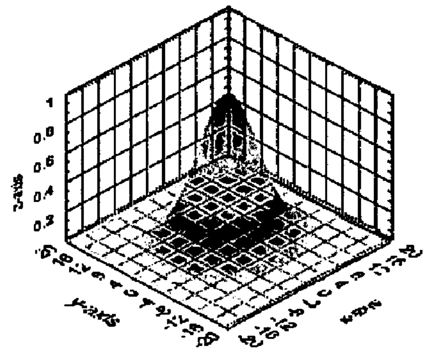
FIG 11.1
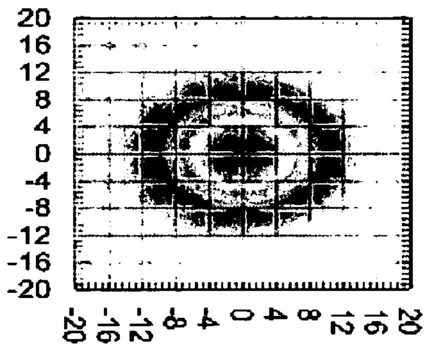
FIG 11.2

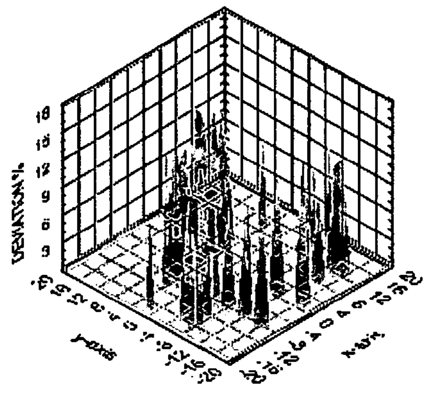
FIG 14.1
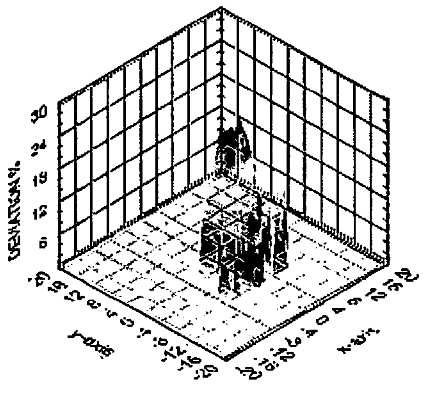
FIG 14.2
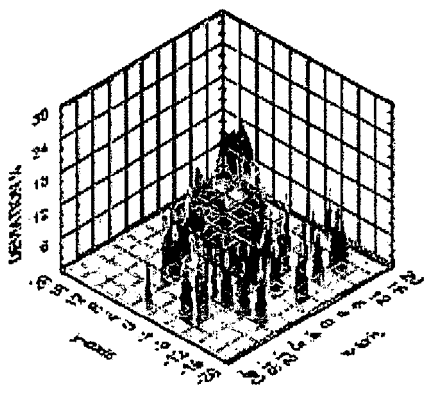
FIG 14.3
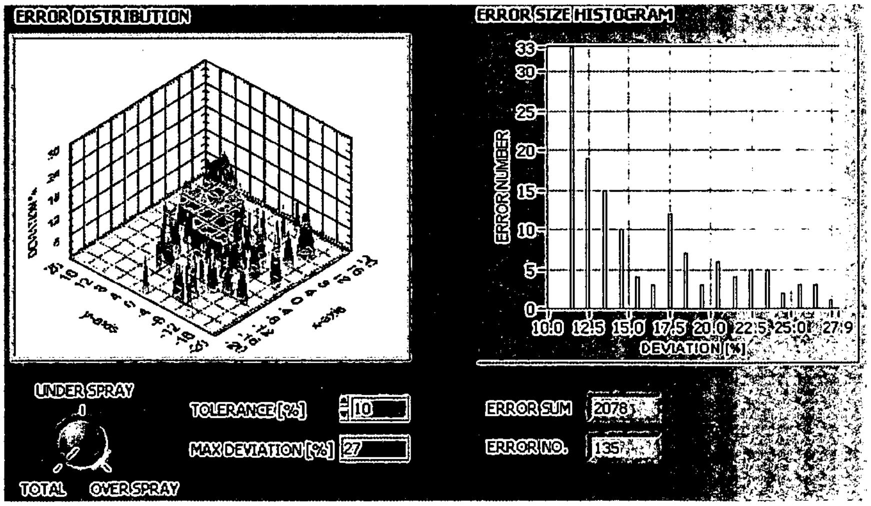
FIG 15

SPRAY PATTERN CHARACTERIZATION AND MONITORING METHOD AND SYSTEM

CROSS-REFERENCE TO RELATED APPLICATIONS

This Application relates to and claims priority from commonly owned U.S. Provisional Application Ser. No. 60/615,169, filed on Oct. 1, 2004, which is incorporated herein by reference.

FEDERALLY SPONSORED RESEARCH

Not Applicable

SEQUENCE LISTING OR PROGRAM

Not Applicable

BACKGROUND OF THE INVENTION

1. Field of Invention

This invention relates generally to the field of spray pattern characterization and performs measurements of spatial particle distributions within a spray, which can be used to monitor a spraying process.

2. Background of the Invention

Sprays are associated with, among others, paint spraying, tablet and implant coating, aerosols for inhalation therapy, and fuel injectors. Since the uniformity and symmetry of the spray pattern is a crucial parameter in most applications, it is important to obtain detailed information on spray characteristics. Such information can be used to detect quality problems in spraying or coating processes and assist furthermore in optimizing aerosol delivery systems or atomizers used, for example, in medical coating applications.

In the prior art, several methods are used for the characterization and analysis of spray patterns.

Spray pattern characterization is often performed using the Patternation Index (P.I.). The P.I. is a measure of the circumferential uniformity and symmetry of the spray and is defined as the normalized variance from the expected mean, summed for all elements. The P.I. indicates the summation of the differences between the ideally uniform percentage and the actual percentage.

Another method is based on the Spray Uniformity Index (S.U.I). The S.U.I calculates the standard deviation of the normalized total intensities per element from the mean and indicates the standard deviation of the normalized local values. It is a measure of the spray uniformity.

A further approach is measuring the pattern shape, for instance an ellipsoid of relative uniform density, as well as the size of the pattern manually.

Yet another approach is based on manually selected regions within an image. Intensity profiles, standard deviation and the median value of the intensity distribution within an image of a spray are used to characterize a spray.

The P.I. and the S.U.I. are a measure for the overall distribution of the spray pattern, but they don't provide information on the location, size or type of asymmetries within the spray pattern. When measuring the shape, size and ratio between the longest and the shortest axes of the pattern manually, distribution densities and asymmetries within the pattern are not detected.

Because manual procedures depend on the judgment of an operator, good repeatability is difficult, if not impossible, to achieve. This is also true when intensity profiles of a user-defined area of an image are obtained. In such cases, the input pattern is based on the area selection of the operator and not on a defined criteria. In addition, a detailed evaluation of location, size, and type of asymmetries within the spray pattern cannot be performed.

In the prior art, characteristics of a spray pattern are not sufficiently quantitatively characterized. Detailed and repeatable information on location, size, and type of asymmetries within a spray pattern, which are important for spray characterization comparability, quality control, and in-situ control of spray processes are not provided. Therefore, there is a need for a new method and system that overcomes the drawbacks of methods and systems known by the prior art.

SUMMARY

The purpose of the invention is to provide a method to characterize a spray pattern by detecting and quantifying asymmetries resulting in detailed information on location, size, and type of asymmetries within the spray pattern, which are crucial for spray characterization comparability, quality control, and control of spraying processes.

An input spray pattern representing the spatial particle distribution within a spray is compared with a suitable reference pattern to detect differences between both patterns and to obtain a quantitative description of the resulting data. A methodology for the repeatable alignment of the spray patterns to be compared is provided. The input spray pattern data to be evaluated can be acquired using among others optical imaging techniques or a mechanical patternator. The reference pattern data may be generated numerically to describe a pattern best suited for the particular application or derived from a previously acquired spray pattern.

In another embodiment a spray pattern is further characterized by providing a functional description of the pattern shape resulting in a simplified spray pattern comparison, classification and in objective quality criteria for atomizer characterization.

The system of the present invention is based on an optical imaging technique to allow acquisition and processing of image data of a spraying process. An important feature of the method and system is the ability to compare a spray pattern and a reference pattern during a spraying process to obtain detailed quantification and localization of asymmetries within a spray pattern.

It is an object to provide a method and system for atomizer characterization and classification providing repeatable results and objective quality control criteria.

It is a further object to provide a method and system to readily identify problems by monitoring location, quantity and size of asymmetries called errors within a spray pattern during operation, as governing parameters change. The obtained error information resulting from deviations between spray pattern and reference pattern may be used for controlling one or more operating parameters such as spray position, atomizing pressure, and spraying cycle to prevent among others inhomogeneous coatings due to atomizer built up or a incorrect position in relation to a spray target.

It is a still another object to control the shape and the distribution of the spray pattern in terms of uniformity and symmetry or to accommodate for various spray target sizes.

In one embodiment, a method is provided for comparing of a spray pattern and a reference pattern, comprising the steps of determining the center of mass of the spray pattern, obtaining a reference pattern, transforming said spray pattern and/or said reference pattern to obtain a match between the center of mass of the spray pattern and the center of mass of the reference pattern, and detecting deviations between both patterns.

In another embodiment, a method is provided for comparing a spray pattern and a reference pattern comprising the steps of obtaining a reference point which is coincident with the spray origin of the spray pattern, obtaining a reference pattern, obtaining a reference point which is coincident with the spray origin of the reference pattern, transforming said spray pattern and/or said reference pattern to obtain a match between the reference point of said spray pattern and the reference point of said reference pattern, and detecting deviations between both patterns.

In a further embodiment, a method is provided for comparing a spray pattern and a reference pattern comprising the steps of obtaining a reference axis from said spray pattern, defining at least one reference point along the reference axis in a predetermined distance from the spray origin of the spray pattern, obtaining a reference axis of the reference pattern, defining at least one reference point along the reference axis having the same distance from the spray origin as the reference point in the spray pattern, transforming said spray pattern and/or reference pattern to obtain a match between the reference point of said spray pattern and the reference point of said reference pattern, and detecting deviations between both patterns.

In a yet another embodiment, the reference pattern is an array of data and the origin of said array is coincident with the center of mass of said reference pattern. The spray pattern is an array of data and the origin of said array is coincident with the center of mass of the spray pattern.

In another embodiment, the deviations between the spray pattern array and the reference pattern array are obtained by calculating the difference of both arrays.

In a further embodiment, the reference pattern is numerically characterized, generated through evaluation of a mathematical function or derived from an acquired spray pattern.

In another embodiment, the reference pattern with the highest degree of conformity with the spray pattern is searched.

In another embodiment, a method for spray pattern characterization is provided comprising the steps of determining the center of mass of the spray pattern, obtaining a reference pattern, transforming said spray pattern and/or reference pattern to obtain a match between the center of mass of the spray pattern and the reference pattern, comparing the spray pattern and the reference pattern by calculating the degree of conformity using a pattern-matching algorithm, and searching for the reference pattern with the highest score value and with the highest degree of conformity with said spray pattern.

In another embodiment, the spray pattern data, which are contained in a two-dimensional array, are characterized by performing a function fit using a function with two independent variables to obtain a match with the data of the spray pattern array.

In yet another embodiment, a method is provided for comparing a spray pattern and a reference pattern comprising the steps of defining a reference point and/or a reference axis within the detection area, obtaining a reference pattern, transforming the center of mass of the reference pattern and/or the reference point of the detection area to obtain a match between the center of mass of the reference pattern and the reference point of the detection area, obtaining a spray pattern, and detecting deviations between both patterns.

In another embodiment, a user acknowledgement and/or an atomizer cleaning cycle is initiated to prevent atomizer clogging, if the center of mass of the spray pattern exceeds the allowed distance from the reference point and/or axis within the detection area and/or the deviations/differences between both patterns are outside a defined tolerance range.

In yet another embodiment, a system is provided to determine the spray pattern position during a spraying process comprising at least one light source to generate a light sheet, at least one detector to acquire a spray pattern, at least one processing unit, at least one atomizer to provide a spray, and a calibration device to project the target point or axis on the light sheet plane, wherein said light sheet is located between atomizer and spray target, said calibration device has at least one reference point and/or reference axis, said calibration device and/or said spray target is adjusted to obtain a match between the reference point and/or reference axis of the calibration device and the desired target point and/or axis of said spray target, and the reference point and/or reference axis of the calibration device is projected on the light sheet plane. In one step, a reference point, which is coincident with the reference point of the calibration device, is obtained within the detection area. In one step, a reference axis, which is collinear with the reference axis of the calibration device, is obtained within the detection area. In another step, the spray pattern position is determined by calculating the distance between the center of mass of the spray pattern and the reference point and/or axis within the detection area.

In yet another embodiment, the position of the atomizer is adjusted in relation to the target to obtain a match between the center of mass of the spray pattern and the reference point and/or axis within the detection area during a spraying process.

In yet another embodiment, a system is provided to detect spray pattern asymmetries during a spraying process comprising at least one light source to generate a light sheet, at least one detector to acquire a spray pattern, at least one processing unit, at least one atomizer to provide a spray, and a calibration device to project the target point or axis on the light sheet plane, wherein said light sheet is located between atomizer and spray target, said calibration device has at least one reference point and/or reference axis, said calibration device and/or said spray target is adjusted to obtain a match between the reference point and/or reference axis of the calibration device and the desired target point and/or axis of said spray target, and the reference point and/or reference axis of the calibration device is projected on the light sheet plane. In one step, a reference point, which is coincident with the reference point of the calibration device, is obtained within the detection area and/or a reference axis, which is collinear with the reference axis of the calibration device, is obtained within the detection area. In another step a reference pattern is obtained and the center of mass of the reference pattern and/or the reference point of the detection area are transformed to obtain a match between the center of mass of the reference pattern and the reference point of the detection area. In a further step, a spray pattern is obtained, and the differences between both patterns are detected.

In yet another embodiment, the position of the atomizer is adjusted in relation to a target to obtain a position of the atomizer, which results in minimum deviations between the spray and the reference pattern during a spraying process.

In yet another embodiment, the atomizer settings are adjusted to minimize the differences between the spray pattern and the reference pattern during a spraying process.

In yet another embodiment, a system is provided to detect spray pattern asymmetries and to control a spraying process comprising at least one light source to illuminate the spray, at least one detector to acquire a spray, at least one processing unit; and at least one atomizer, wherein a spray pattern and a reference pattern are obtained, said spray pattern and/or reference pattern are transformed to obtain a match between the center of mass of said spray pattern and the center of mass of said reference pattern, the differences between both patterns are detected and the atomizer settings are adjusted to minimize the differences between both patterns.

DRAWINGS

The accompanying drawings, which are incorporated in and constitute a part of this specification, serve to explain the principles of the invention. The drawings are in simplified form and not to precise scale FIG. 1 is a flow chart describing the main steps of the method.

FIG. 2 is a flow chart showing the input pattern for the processing procedure.

FIG. 3.1 is a 3-D Intensity Plot of the input pattern with signal noise.

FIG. 3.2 is a 3-D Intensity Plot of the normalized input pattern after signal noise elimination and pattern transformation.

FIG. 4.1 depicts a cross-sectional view of the input pattern visualizing the pattern transformation.

FIG. 4.2 shows a longitudinal view of the input pattern visualizing the pattern transformation.

FIG. 10 is a flow chart of a characterization procedure using function fit.

FIG. 11.1 is a 3-D Intensity Plot of the reference pattern.

FIG. 11.2 is a top view of the reference pattern.

Figure 12:
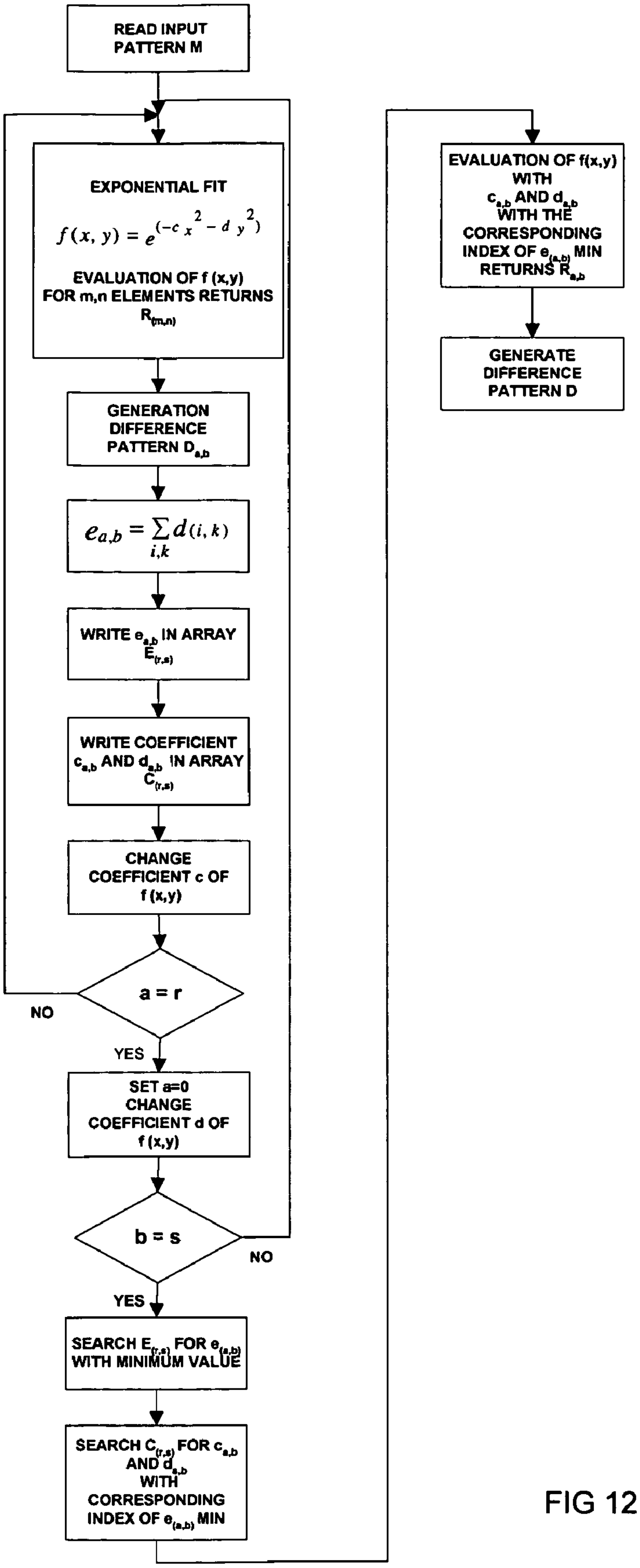

FIG. 12 is an example of a characterization procedure using function fit.

Figure 13:
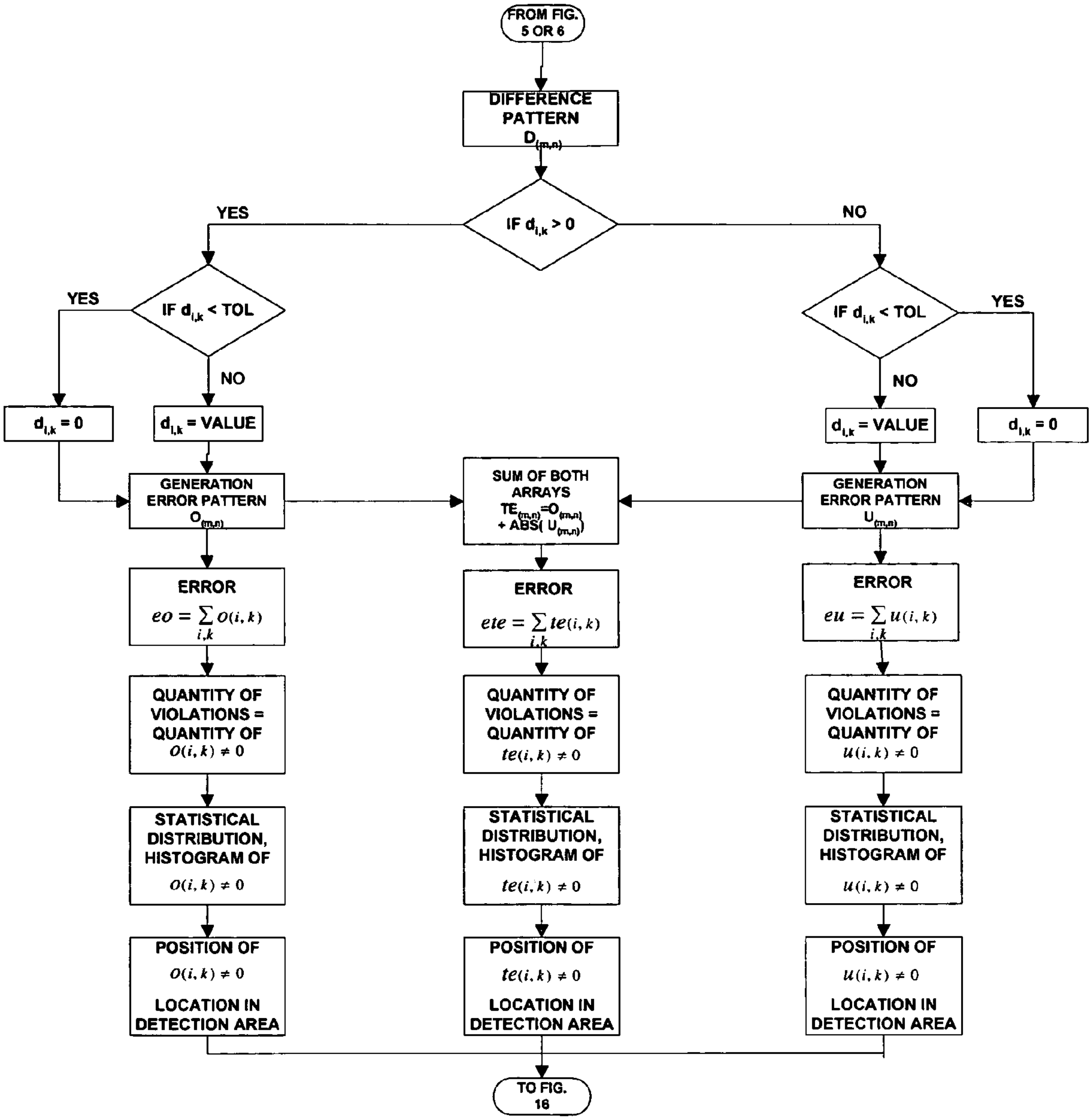

FIG. 13 is a flow chart of the error evaluation and definition algorithm.

FIG. 14.1 is a 3-D Intensity Plot of the error pattern, visualizing errors caused by high density distribution.

FIG. 14.2 is a 3-D Intensity Plot of the error pattern, visualizing errors caused by low density distribution.

FIG. 14.3 is a 3-D Intensity Plot of the error pattern, visualizing errors caused by high and low-density distribution.

FIG. 15 is a software screen dump of the error evaluation results.

Figure 16:
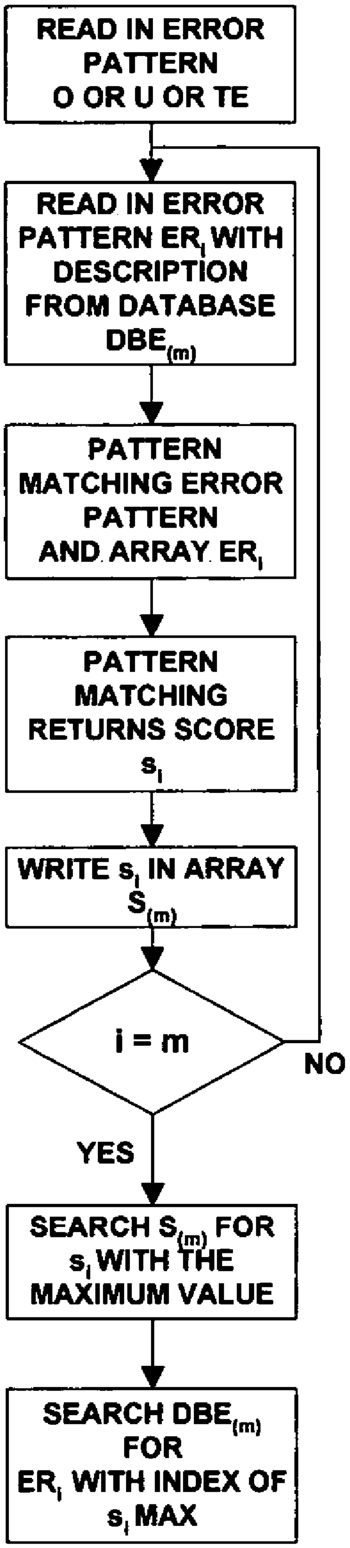

FIG. 16 is a flow chart of an error recognition procedure based on pattern matching.

Figure 17:
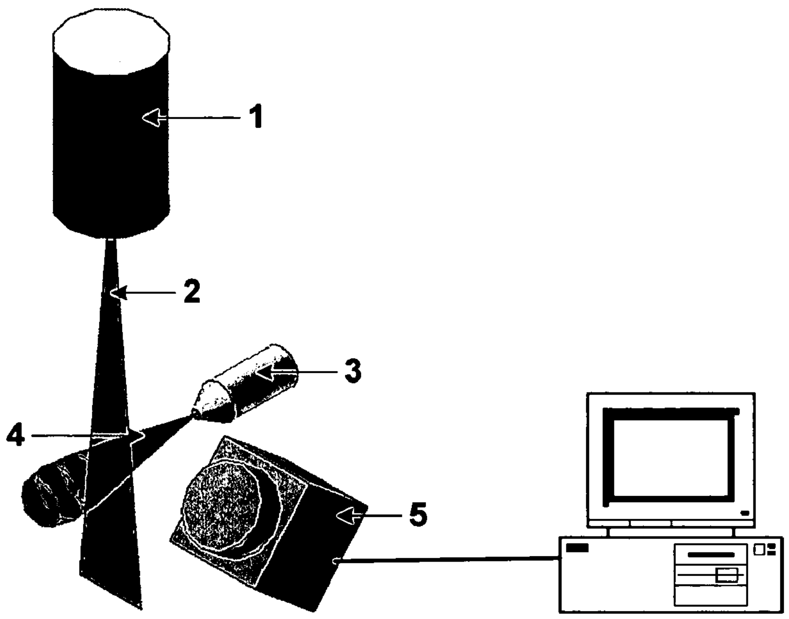

FIG. 17 is a perspective view of a system setup for spray characterization.

Figure 18:
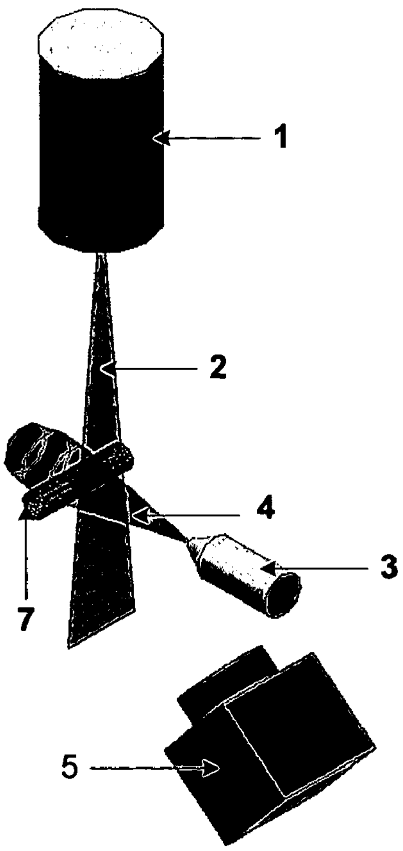

FIG. 18 is a perspective view of a system setup for in-situ spray coating control.

Figure 19:
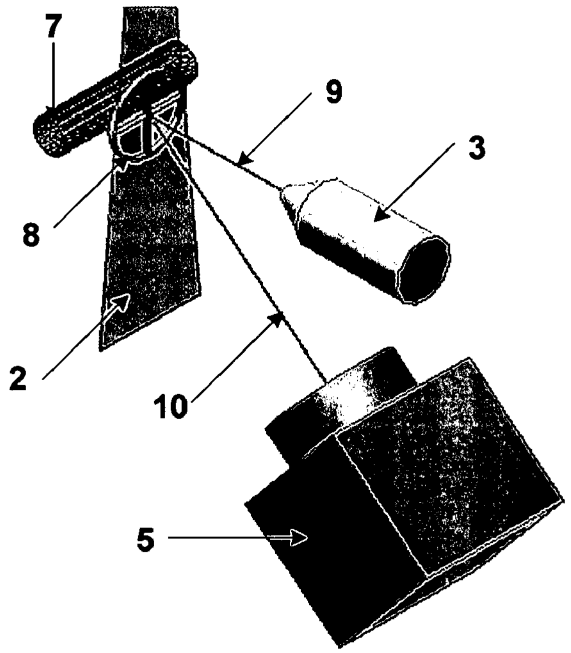

FIG. 19 is the system setup of FIG. 18 during spray target calibration.

Figure 20:
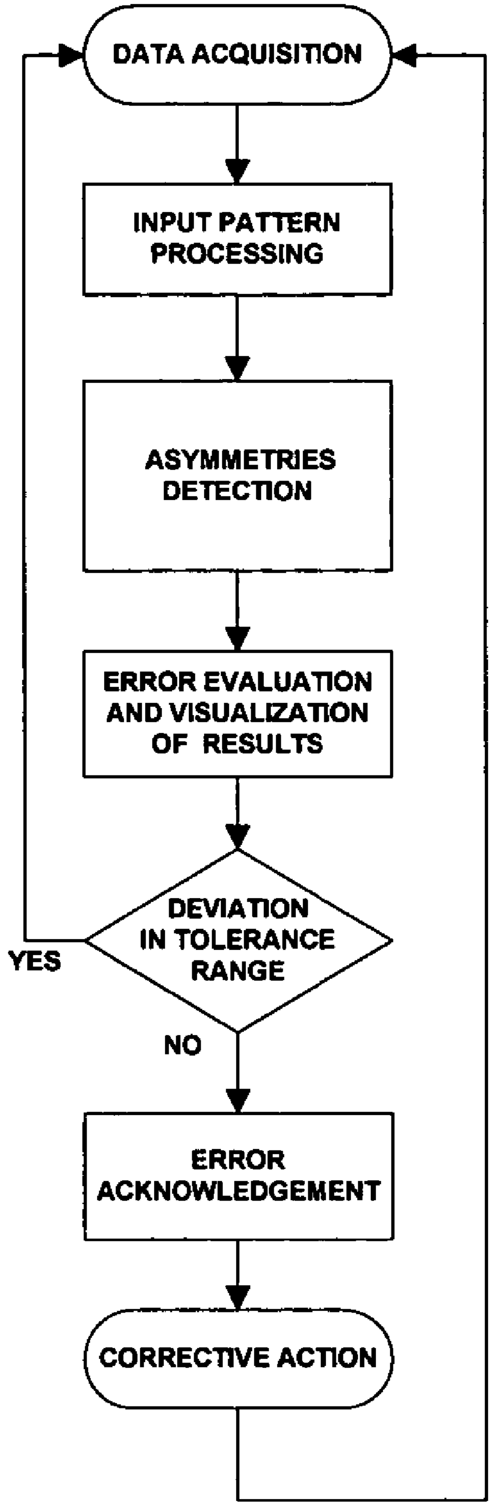

FIG. 20 is a flow chart of a spray pattern control procedure.

DETAILED DESCRIPTION

While the invention will be described in connection with certain embodiments, it will be understood that the invention is not limited to these embodiments. On the contrary, the invention includes all alternatives, modifications and equivalents as may be included within the spirit and scope of the present invention. Details in the Specification and Drawings are provided to understand the inventive principles and embodiments described herein, to the extent that would be needed by one skilled in the art to implement those principles and embodiments in particular applications that are covered by the scope of the claims.

A detailed evaluation of a spray pattern, also called the input pattern, is achieved by comparing the input pattern with a reference pattern obtained through an empirical or mathematical approach. The input pattern may be comprised in a two-dimensional array, such as an array with a Cartesian or Polar coordinate system.

Figure 1:
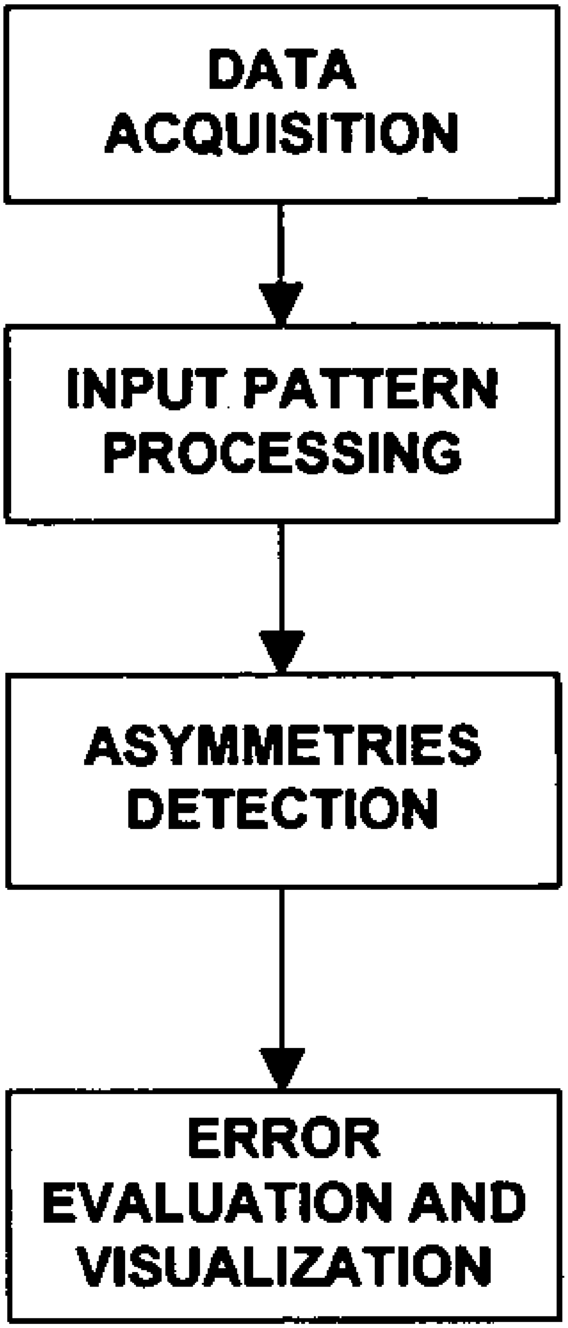

Referring to FIG. 1, an overview of the spray pattern evaluation method of the present invention is shown. In step one, the input spray pattern data, also called the input pattern, is acquired. In the next step, the acquired input pattern is processed using an input pattern processing algorithm. In a further step, the reference pattern is obtained and the differences between both patterns are calculated using a detection algorithm. In the final step, an error evaluation and definition algorithm searches the difference pattern for errors and analyzes the detected errors. The steps of FIG. 1 are described in further detail below.

The input spray pattern data to be evaluated can be acquired by using, among others, optical imaging techniques (as describe later herein) or a mechanical patternator.

The input pattern processing algorithm is illustrated in FIG. 2. A background noise check of an input spray pattern is performed. If the input pattern contains background noise, as shown in FIG. 3.1, the background noise of the image data may be minimized or eliminated by applying a threshold function. This is desirable because the background noise will affect the accuracy of the calculation of the reference point within the spray pattern.

In the next step, a calibration image may be used to assign calibration parameters and correct perspective distortions in order to adjust the spatial measurements accordingly. In the following step, the reference point within the input pattern is calculated. In a further step, the pattern is transformed as shown in FIG. 4.1 and FIG. 4.2.

With reference to FIG. 4.1, the center of mass of the input pattern is calculated by evaluating the intensity values' weighted average for the array in both the x and y directions, and is then used as a reference point. Referring to FIG. 4.2, the reference axis [7], which is parallel to the spray axis within the input pattern, is computed by evaluating the intensity values' weighted average for the array in either the x or y direction. An element of the array, which is located along the reference axis in a predetermined distance from the spray origin [8] is used as a reference point [6]. The input pattern is transformed to obtain a match between the origin of the array [4] and the reference point [3,6].

In a further step, the normalization of the input pattern may be performed. A 3-D intensity plot of the resulting spray pattern is shown in FIG. 3.2.

Figure 5:
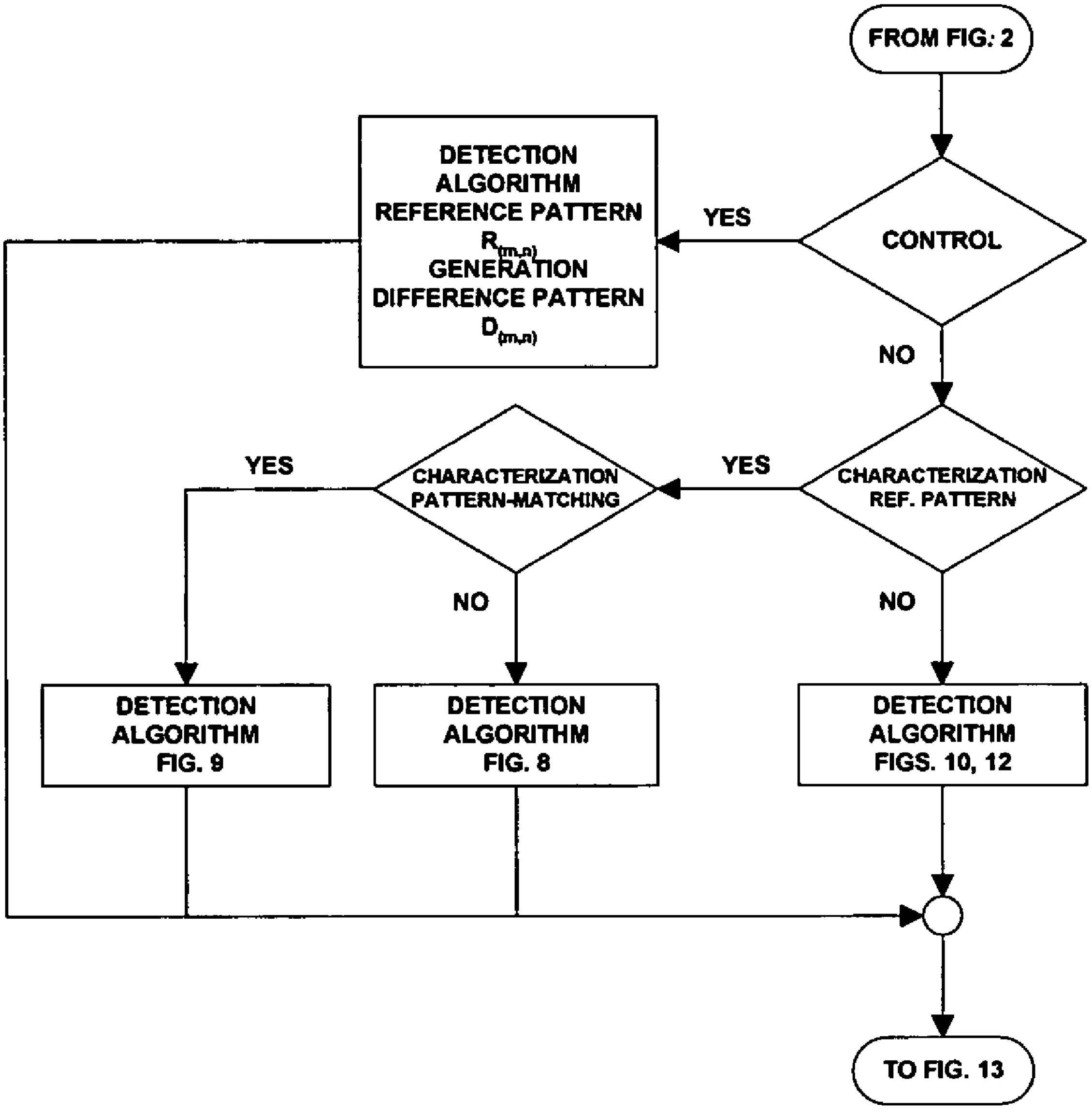
FIG. 5 is a flow chart with a general description of the detection procedure.

A reference pattern may be obtained from previously acquired spray patterns, for instance empirical data or numerically characterized reference patterns. Referring to FIG. 5, a suitable reference pattern may be chosen depending on the particular application. For in-situ control of spraying processes, a reference pattern best suited for the particular application may be used. In spray characterization applications, a reference pattern that best matches the input pattern and provides a uniform distribution is searched.

Figure 6:
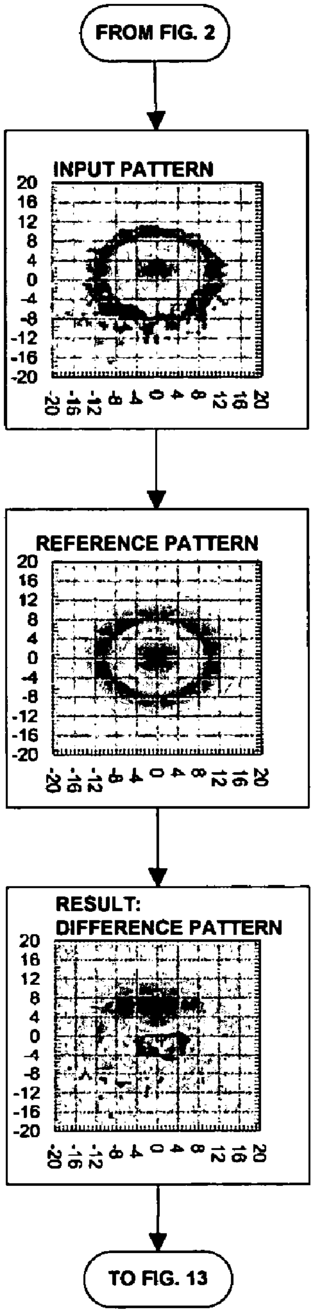
FIG. 6 is a top view of input pattern, reference pattern, and difference pattern.

Referring to FIG. 6, a detection algorithm compares an input pattern with a suitable reference pattern. The resulting difference between both is referred to as the difference pattern. An intensity plot of the input pattern, the reference pattern and the resulting difference pattern is shown. A uniform, symmetric reference pattern, where the center of mass is coincident with the origin of the reference pattern array, is preferably used to detect asymmetries within the input pattern array. The reference pattern array should preferably have the same size, number of elements and the same point of origin (0,0) as the input pattern array.

Figure 7:
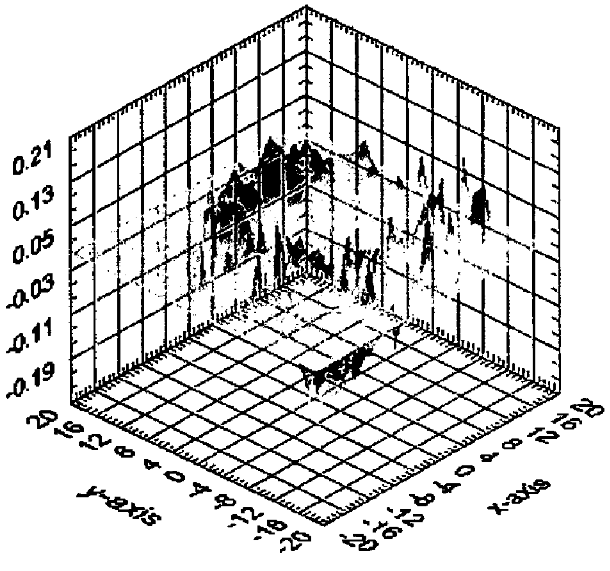
FIG. 7 is a 3-D Intensity Plot of the resulting difference pattern.

FIG. 7 shows a 3-D intensity plot of the resulting difference pattern, illustrating the deviations between the input and reference patterns. The difference pattern provides information on deviation type, total deviations, number of deviations, and deviation positions of the input pattern in relation to the reference pattern. The deviation pattern allows for the detection of possible asymmetries within the spray pattern.

"Z" values within the resulting difference pattern not equal to 0 represent a deviation from the reference pattern. Areas characterized by low or high distribution densities of particles within the spray pattern are detected. Positive "Z" values show deviations resulting from high distribution densities of particles, and negative "Z" values illustrate deviations resulting from low distribution densities.

There are several methods for pattern characterization and classification, which are described below.

Figure 8:
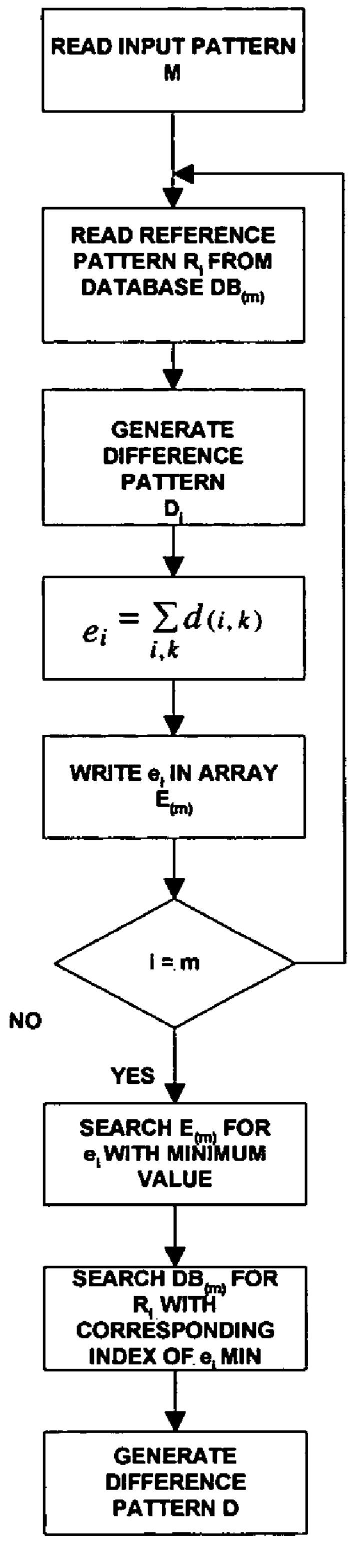
FIG. 8 is a flow chart of a characterization procedure using a search algorithm.
Figure 9:
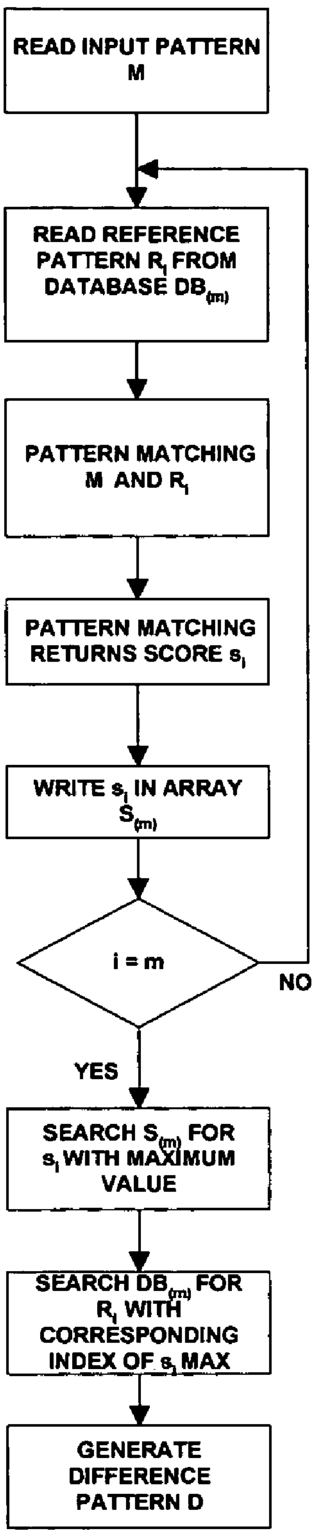
FIG. 9 is a flow chart of a characterization procedure using a pattern-matching algorithm.

If there are reference patterns available, for instance stored in a database, a spray pattern characterization and classification approach, as represented in FIG. 8 and FIG. 9, may be adopted.

Referring to FIG. 8, a reference pattern is read from a Database $DB_{(m)}$, and a Difference Pattern $D_l$ with the same index as the Reference Pattern $R_i$ is calculated. In the next step, the sum $e_i$ of the absolute values of all elements within $D_l$ is calculated and the value of $e_i$ is stored in the array $E_{(m)}$. For each available Reference Pattern $R_l$ in Database $DB_{(m)}$, a Difference Pattern $D_i$ and the sum $e_l$ is calculated and stored. After calculation of $D_l$ and $e_l$ for each available Reference Pattern $R_l$, an algorithm searches for the minimum value of $e_l$ within $E_{(m)}$. The Reference Pattern $R_l$ with the corresponding smallest $e_l$ value and the highest degree of conformity in relation to the Input Pattern M, is used to calculate the Difference Pattern.

Another procedure, based on an image comparison technique called pattern matching, may be adopted in case the reference pattern cannot be described sufficiently using a numerical characterization approach.

Referring to FIG. 9, an input pattern and a reference pattern are read from a Database $DB_{(m)}$. A pattern-matching algorithm evaluates the degree of conformity between Input Pattern M and Reference Pattern $R_l$. For each available Reference Patterns $R_l$ in Database $DB_{(m)}$, a score value $s_l$ is calculated and stored in an array $S_{(m)}$. In the next step, the maximum score value of $s_l$ within $S_{(m)}$ is searched within the available Reference Patterns $R_l$. The resulting Reference Pattern $R_l$, having the maximum score value $s_l$ and the highest degree of conformity with the Input Pattern M, is used to compute the difference pattern.

If there are no available reference patterns, a spray pattern may be characterized and classified as described in FIG. 10 and FIG. 12. An example of a resulting reference pattern is illustrated in FIG. 11.1 and FIG. 11.2.

Referring to FIG. 10, a search for function f(x,y) is performed to obtain a reference pattern with a symmetric distribution that best represents the spray pattern data. A search for function f(x,y) can be obtained through the best fit approximation and least square method, by minimizing the sum of the squares of residuals. In the next step, the function is evaluated for the same number of elements as the input pattern and a difference pattern is calculated.

Referring to FIG. 12, a further approach to obtain the function f(x,y) through coefficient fit is provided.

In the first step, a search algorithm returns a set of fit coefficients for a predetermined fit function. Function f(x,y) is calculated using an exponential coefficient fit. In the next step, the input pattern is read and an exponential fit is performed. A set of coefficients describing the exponential function is returned. In a further step, $R_{(m,n)}$ is obtained by evaluating f(x,y) for m,n elements. In the following step, Difference Pattern $D_{a,b}$ is calculated from Input Pattern M and Reference Pattern $R_{(a,b)}$. In another step, the sum $e_{a,b}$ of the absolute values of all elements within $D_{a,b}$ is calculated and the value of $e_{a,b}$ is stored in the array $E_{(r,s)}$. The coefficients of the function $c_{a,b}$ and $d_{a,b}$ are stored in the array $C_{(r,s)}$. The coefficient c of f(x,y) is changed.

If the number of iterations is not equal to r, the algorithm repeats the procedure. If the number of iterations a is equal to r, the index a is set to 0 and the coefficient d of f(x,y) is changed. If the number of iterations b is not equal to s, the algorithm repeats the procedure. If the number of iterations b is equal to s, the algorithm searches for $e_{a,b}$ with the smallest value within the array $E_{(r,s)}$.

In the next step, the algorithm searches within $C_{(r,s)}$ for the coefficients $c_{a,b}$ and $d_{a,b}$ with the index a,b having the same index as $e_{a,b}$ with the smallest value within $E_{(r,s)}$. In a further step, the function f(x,y) for m,n elements with the coefficients $c_{a,b}$ $d_{a,b}$ having the corresponding index of $e_{a,b}$ with the smallest value is evaluated. Reference Pattern $R_{(m,n)}$ is returned. An example of a calculated Reference Pattern $R_{(m,n)}$ with a uniform, symmetric distribution of "Z" values around the origin of the array is shown in FIG. 11.1 and 11.2. In another step, Difference Pattern D is computed from Input Pattern M and Reference Pattern R.

The error evaluation and definition algorithm, which is used to evaluate and characterize the asymmetries within a spray pattern, is represented in FIG. 13. In the first step, the algorithm checks if the value of each element of the Difference Pattern $d_{l,k}$ is greater than 0. Z values not equal to 0 indicate a deviation from the reference pattern.

After separating positive and negative elements within the difference pattern, the algorithm checks if the value of $d_{l,k}$ is within the defined tolerance range. If the value of $d_{l,k}$ is within the defined tolerance range, the value of $d_{l,k}$ is substituted by 0. If the value of $d_{l,k}$ is not within the defined tolerance range, the value of $d_{l,k}$ is not changed.

After checking the tolerance range for each element $d_{l,k}$ of the difference pattern, the algorithm generates two error patterns for errors generated by high and low distribution densities of particles with the same number of elements as the difference pattern. An example for an error pattern resulting from high and low distribution densities of particles within a spray is represented in FIG. 14.1 and FIG. 14.2. The Error Pattern $TE_{(m,n)}$, which can be calculated by adding $O_{(m,n)}$ and the absolute value of $U_{(m,n)}$, visualizes errors generated by high and low distribution densities of particles.

In the next step, error sum and number is calculated from $O_{(m,n)}$, $U_{(m,n)}$ and $TE_{(m,n)}$, and the error size distribution is computed. Referring to FIG. 15, a software screen dump of an error evaluation example is represented. A 3-D intensity plot of the Error Pattern $TE_{(m,n)}$, describing error size and position within the detection area and a histogram plot illustrating location and size of the deviation of the input pattern from the reference pattern, is displayed. The histogram plot shows error sizes (x-axis) and number of errors (y-axis). Furthermore, error sum and maximum deviation between input pattern and reference pattern are also displayed.

Error sum, the sum of the error values of all elements within $TE_{(m,n)}$ and the number of error elements within $TE_{(m,n)}$, is a measure of the total deviation of the spray pattern from the reference pattern. For optimized error detection and visualization, it is desirable to adjust the error tolerance range in order to control error visualization and to define error criteria for the particular process.

FIG. 16 represents an example of a further evaluation method using an error pattern based on an error pattern matching procedure, which may be used to identify previously classified error patterns within a spray pattern.

FIG. 17 is a schematic of a spray characterization and control system according to the present invention. The system includes a light source [1] and a detector [5] that is connected to a processing unit [11] equipped with the evaluation software. The processing unit is preferably a computer platform including an Intel Pentium-based computer system running a Windows 2000 operating system. The user terminal includes a monitor and input devices, such as a keyboard and mouse.

FIG. 5 shows the preferred spray pattern evaluation method comprising the input pattern processing algorithm, the detection algorithm for in-situ control of a spraying process, the spray pattern characterization algorithm for atomizer classification, as well as the error evaluation and definition algorithm.

A spray is produced using an atomizer [3], such as a pneumatic spray nozzle as illustrated in FIG. 17. The spray pattern can be changed by adjusting the atomizer settings, such as atomizing pressure or the ratio of central air and fan air. An example setup for a spray characterization and control system, as shown in FIG. 17, is described in detail below.

The spray area is illuminated using a Diode Pumped Solid State (DPSS) Laser (Chrystallaser, Nev.) with a wavelength of 532 nm. For best results, the laser should be equipped with a light sheet optic with adjustable focus length. The light sheet optic is used to correct the Gaussian intensity distribution of the laser beam and to obtain a light sheet intensity profile with a homogeneous intensity distribution.

A previous evaluation of the laser beam in terms of distribution uniformity may be performed to make sure that the laser produces a light sheet with a homogeneous intensity distribution. The resulting light sheet is focused on the detection area and placed downstream from the nozzle. The droplets crossing the light sheet generate a scattered light, which is captured by a detector [5], such as a Progressive Scan Charged Coupled Device (CCD) camera, equipped with a CCD chip with a resolution of 680×480 pixels. It is desirable that the shutter speed of the CCD camera is as small as possible to prevent motion blur.

The camera captures the image of the light scattered by the droplets in the spray. The intensity of parts of the acquired image is directly proportional to the local intensity of the laser light sheet and the local concentration of the droplet surface area. The light is then transformed into an electrical signal, which is transferred to a PC equipped with a NI1409 frame grabber card (National Instruments, TX). The intensity values within the resulting image, also referred to as the input pattern, describe the spatial particle distribution called the spray pattern.

The method and the system of the present invention allows for easy customization and integration to meet the needs of a variety of spray testing and spray control applications, as described in the following examples.

FIG. 17 shows an example set-up for the quality control of atomizers. In the first step, image data is captured and transformed into a two-dimensional array. Since background noise has a negative impact on the calculation of the position of the center of mass, the background noise of the image data is minimized. In the next step, a threshold function, which substitutes all values in the input pattern below the minimum threshold value with 0, is applied to the array. A calibration image may be used to assign calibration parameters to the image and correct perspective distortions in order to adjust the spatial measurements accordingly.

In a following step, the center of mass of the two-dimensional array is determined by evaluating the intensity values' weighted average for the array in both the x and y directions. In a further step, the array is transformed to obtain a match between the origin of the array and the center of mass. In another step, the normalization of the array is performed.

For optimized characterization of the spray, the detection algorithms of FIG. 10 and FIG. 12 are chosen, which returns a reference pattern best suited for the measured pattern. A search procedure, which returns a set of fit coefficients, is used to calculate the f(x,y). The resulting function f(x,y) describes the distribution within the input pattern and is evaluated for the same number of elements as the Input Pattern M. The evaluation of function f(x,y) returns the reference pattern. The difference pattern is obtained by calculating the difference between the Input Pattern M and Reference Pattern R.

To determine, among others, error type, error size, error position, error number, and error size distribution, the procedure shown in FIG. 14 is adopted. The procedure returns the exact quantification of size and position of asymmetries and provides information on center of mass, longest diameter $D_{max}$, shortest diameter $D_{min}$, etc. Furthermore, the spray pattern is described in terms of symmetry, returning, for example, maximum deviation, error number, error location and error sum.

For spray plume characterization, the laser and camera axis are located in one plane, which is perpendicular to the spray axis. The light sheet illuminates a longitudinal cross section of the plume. Image data is acquired and processed as shown in FIG. 2.

Referring to FIG. 4.2, the reference axis [7], which is parallel to the spray axis within the input pattern, is calculated by evaluating the intensity values' weighted average of the input pattern array in y direction. An element of the array located along the reference axis in a predetermined distance from the spray origin [6] is used as a reference point.

In the next step, the input pattern is transformed to obtain a match between the origin of the array [4] and the reference point [6]. In another step, normalization of the input pattern is performed. For optimized characterization of the spray, the detection algorithm of FIG. 10, which returns a reference pattern best suited for the measured pattern, is chosen.

The function f(x,y) describing the spray pattern is performed using the best fit approximation and least square method. Function f(x,y) can be used as descriptive information for the characterization and classification of a spray pattern and atomizer. The evaluation of function f(x,y) returns the reference pattern.

In a further step, the difference pattern is calculated. To determine error type, error size, error position, error number, and error size distribution, the method shown in FIG. 13 is adopted. The exact quantification of size and position of asymmetries and information on, among others, center of mass, longest diameter $D_{max}$, shortest diameter $D_{min}$, etc. is provided. Furthermore, the spray pattern is described in terms of symmetry by providing information on maximum deviation, error number, error location and error sum.

FIG. 18 shows an example set-up for in-situ monitoring and control of a coating process of a medical device. During the spray coating process, the errors within the spray pattern and the current position of the spray in relation to a spray target are continuously monitored and controlled.

The light sheet of the light source is located between the atomizer and the spray target. The calibration device is used to project the target point on the light sheet plane. The calibration device and/or said spray target is adjusted to obtain a match between the reference point and/or reference axis of the calibration device and the desired target point and/or axis of said spray target. The reference point and/or reference axis of the calibration device is projected on the light sheet plane.

The camera axis [10] is adjusted to be coincident with the reference point of the calibration device. A region of interest and a reference point are defined within the detection field. In the next step, the region of interest is transformed resulting in a match between the reference point within the detection field and the reference point of the calibration device.

To characterize the spray, the best suited reference pattern for the particular application is chosen. The center of mass of the reference pattern and/or the reference point of the detection area is transformed to obtain a match between the center of mass of the reference pattern and the reference point of the detection area. The continuously acquired image data is processed as shown in FIG. 2 and a difference pattern is calculated for each acquired spray pattern.

The spray pattern position is monitored during operation in relation to the target by calculating the distance between the center of mass of the spray pattern and the reference point within the detection area. The atomizer is aligned during operation in order to minimize the distance between center of mass of the spray pattern and the reference point within the detection area and to minimize the deviations between the spray pattern and the reference pattern. Furthermore the atomizer settings are adjusted to minimize the deviations between the spray pattern and the reference pattern.

As shown in FIG. 15, the error tolerance range may be adjusted to determine the allowed deviation of the input spray pattern in relation to the reference pattern. If the input pattern is not within the desired tolerance range, an error acknowledgement with a detailed description of the error may be returned. Information on error type, error size, error positions, number of errors, error distribution, and current deviation between target location and spray pattern is provided. Furthermore, a corrective action, such as an adjustment of the atomizing pressure of the atomizers to correct the shape and the spatial particle distribution of the spray, may be proposed to the operator.

The invention claimed is:

1. Method for comparing a spray pattern and a reference pattern, comprising the steps of:
- obtaining the spray pattern to be characterized;
- determining a reference point of the spray pattern;
- obtaining a reference pattern representing a desired spray distribution for said spray pattern suited for determining at least one parameter related to the quality of said spray pattern;
- determining a reference point of said reference pattern;
- transforming said spray pattern and/or said reference pattern to obtain a match between the reference point of said spray pattern and the reference point of said reference pattern; and
- detecting deviations between both patterns to assess said at least one parameter related to the quality of the spray pattern.

2. The method of claim 1, wherein the reference pattern is an array of data and the origin of said array is coincident with the reference point of said reference pattern, and the spray pattern is an array of data and the origin of said array is coincident with the reference point of said spray pattern.

3. The method of claim 2, wherein the deviations are obtained by calculating the difference of both arrays.

4. The method of claim 1, wherein the reference pattern is derived using a numerical approximation method.

5. Method for spray pattern characterization according claim 3, further comprising the step of searching for the reference pattern with the smallest difference with the spray pattern.

6. The method according claim 1, wherein the reference point of the spray pattern is coincident with the origin of the spray pattern.

7. The method according claim 1, further comprising the steps of:
- obtaining a reference axis from the spray pattern;
- defining the reference point of said spray pattern along said reference axis in a predetermined distance from the origin of the spray pattern;
- obtaining a reference axis of the reference pattern; and
- defining at least one reference point for the reference pattern along said reference axis.

8. The method of claim 1, further comprising the steps of:
- comparing the spray pattern and the reference pattern by calculating the degree of conformity using a pattern-matching algorithm; and
- searching for the reference pattern with the highest score value and with the highest degree of conformity with said spray pattern.

9. The method according claim 1, wherein the reference point of the spray pattern is the center of mass.

10. The method according claim 1, wherein the reference pattern is generated through evaluation of a mathematical function.

11. The method according claim 1, wherein the reference pattern is derived from an acquired spray pattern.

12. The method according claim 1, wherein the reference point of the reference pattern is the center of mass.

13. Method for characterization of spray pattern data comprising the steps of:
- obtaining the spray pattern data to be characterized, the spray pattern data being contained in a two-dimensional array;
- calculating a reference pattern that best matches the spray pattern data and is suited for analyzing the spray pattern data;
- wherein the reference pattern for said spray pattern is obtained by performing a function fit using a function with two independent variables.

14. Method for comparing a spray pattern and a reference pattern comprising the steps of:
- defining a reference point within the detection area;
- obtaining a reference pattern, the reference pattern representing a desired spray distribution for said spray pattern suited for determining at least one parameter related to the quality of said spray pattern;
- defining a reference point of the reference pattern;
- transforming the reference pattern and/or the detection area to obtain a match between the reference point of the reference pattern and the reference point of the detection area;
- obtaining a spray pattern within the detection area; and detecting the deviations between both patterns to assess said at least one parameter related to the quality of the spray pattern.

15. The method according claim 14, wherein a user acknowledgement and/or an atomizer cleaning cycle is initiated to prevent atomizer clogging, if at least one parameter related to the quality of the spray pattern exceeds a defined tolerance range.

16. The method according claim 14, wherein the reference point of the reference pattern is the center of mass.

17. An apparatus to analyze the spray quality during a spraying process comprising:

at least one light source to generate a light sheet;

at least one detector to acquire a spray pattern;

at least one processing unit; and at least one atomizer to provide a spray wherein a reference point is obtained within the detection area;

a reference pattern representing a desired spray distribution suited for said spray pattern for determining at least one parameter related to the quality of said spray pattern is obtained;

a reference point of the reference pattern is determined;

the reference pattern and/or the detection area is transformed to obtain a match between the reference point of the reference pattern and the reference point of the detection area;

a spray pattern is obtained within the detection area; and the deviations between both patterns are detected to assess said at least one parameter related to the quality of the spray pattern.

18. The apparatus according claim 17, wherein the position of the atomizer is adjusted to minimize the deviations between the spray pattern and the reference pattern.

19. The apparatus according claim 17, wherein the atomizer settings are adjusted to minimize the deviations between the spray and the reference pattern.

20. The apparatus according claim 17, further comprising a spray target wherein the detection area and/or the spray target are adjusted to obtain a match between the reference point of the detection area and the spray target.

21. The apparatus according claim 20, wherein the apparatus is used during a spray coating process and asymmetries within the spray pattern in relation to the spray target are monitored.

22. The apparatus according claim 21, wherein the spray target is a medical device.

23. The apparatus according claim 17, wherein the step of detecting the deviations between the spray pattern and the reference pattern includes quantifying the asymmetries to obtain a detailed information on location, size, and type of asymmetries within the spray pattern.

24. The apparatus according claim 17, wherein a reference point of the spray pattern is obtained, which is determined by calculating the center of mass of the spray pattern, and at least one parameter related to the reference point of the spray pattern and the reference point of the detection area is analyzed.

25. The apparatus according claim 24, wherein the atomizer is positioned to obtain a match between the center of mass of the spray pattern and the reference point within the detection area of a spraying process.

* * * * *